United States Patent
Fries et al.

(10) Patent No.: US 12,291,105 B2
(45) Date of Patent: May 6, 2025

(54) MOTOR VEHICLE HAVING A DC VOLTAGE ONBOARD POWER SUPPLY

(71) Applicant: AUDI AG, Ingolstadt (DE)

(72) Inventors: Benedikt Fries, Bernhardswald (DE); Cornelius Rettner, Lauf an der Pegnitz (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 18/533,030

(22) Filed: Dec. 7, 2023

(65) Prior Publication Data

US 2024/0190260 A1 Jun. 13, 2024

(30) Foreign Application Priority Data

Dec. 8, 2022 (DE) .......................... 102022132613.6

(51) Int. Cl.
*B60L 15/04* (2006.01)
*B60L 1/02* (2006.01)
*B60L 15/00* (2006.01)

(52) U.S. Cl.
CPC ................. *B60L 15/04* (2013.01); *B60L 1/02* (2013.01); *B60L 15/007* (2013.01); *B60L 2210/10* (2013.01)

(58) Field of Classification Search
CPC .......... B60L 15/04; B60L 1/02; B60L 15/007; B60L 2210/10
See application file for complete search history.

(56) References Cited

U.S. PATENT DOCUMENTS

| 9,027,723 | B2* | 5/2015 | Niizuma | H02J 50/12 191/10 |
| 9,067,497 | B2* | 6/2015 | Ichikawa | B60M 7/003 |
| 10,644,588 | B2 | 5/2020 | Werker et al. | |
| 11,413,975 | B2 | 8/2022 | Pfeilschifter et al. | |
| 11,413,983 | B2* | 8/2022 | Ge | H02M 1/14 |
| 2005/0178632 | A1* | 8/2005 | Ross | B60L 7/14 191/10 |

(Continued)

FOREIGN PATENT DOCUMENTS

DE 102014010346 B3 11/2015
DE 102017120924 A1 3/2019

(Continued)

*Primary Examiner* — Adam D Houston
(74) *Attorney, Agent, or Firm* — Seed IP Law Group LLP

(57) ABSTRACT

A motor vehicle includes a DC voltage power supply, a component, a filter, and a shield. The component is connected across the filter module to the DC voltage power supply. The filter module is connected across an power supply connection of the filter module to the DC voltage power supply and across a component connection of the filter module to the component. The filter module dampens alternating voltage coupled into the component connection by the component. The shield encloses either a power supply line that connects the component to the component connection, or a connection region in which the component connection contacts a power supply connection of the component, together with the component and the filter module. The shield at least partly shields out electromagnetic radiation emitted from the power supply line or the connection. The component connection is reversibly detachable from the component or the power supply line.

12 Claims, 2 Drawing Sheets

(56) References Cited

U.S. PATENT DOCUMENTS

| | | | |
|---|---|---|---|
| 2019/0359074 A1* | 11/2019 | Kume | B60K 17/356 |
| 2020/0079233 A1 | 3/2020 | Kim | |
| 2024/0190258 A1* | 6/2024 | Dobmeier | B60L 15/007 |
| 2024/0190260 A1* | 6/2024 | Fries | B60L 15/04 |
| 2024/0190273 A1* | 6/2024 | Boehme | B60L 53/16 |
| 2024/0253489 A1* | 8/2024 | Tröster | B60L 58/10 |

FOREIGN PATENT DOCUMENTS

| | | | | |
|---|---|---|---|---|
| DE | 102018215769 A1 | 3/2020 | | |
| DE | 102019100227 A1 | 7/2020 | | |
| DE | 102020209238 A1 | 1/2022 | | |
| EP | 2711233 A2 * | 3/2014 | | B60L 1/00 |
| EP | 2891576 A2 | 7/2015 | | |
| WO | 2017/220242 A1 | 12/2017 | | |

\* cited by examiner

MOTOR VEHICLE HAVING A DC VOLTAGE ONBOARD POWER SUPPLY

BACKGROUND

Technical Field

The disclosure relates to a motor vehicle having a DC voltage onboard power supply, wherein at least one component is connected to the DC voltage onboard power supply, by which the DC voltage onboard power supply can be energized in at least one operating mode of the motor vehicle and/or which is energized in at least one further operating mode of the motor vehicle by the DC voltage onboard power supply. In addition, the disclosure relates to a method for connecting a component to a DC voltage onboard power supply of a motor vehicle.

Description of the Related Art

In motor vehicles the propulsion may involve one or more electric motors, usually three-phase motors, which are generally energized by power converters. Such a converter can cause high-frequency voltage fluctuations in cables of the onboard power supply and other components which are hooked up to the onboard network of the motor vehicle.

In the prior art, shielded and shielded and unshielded onboard power supplies are known. In shielded onboard power supplies, for example, shielded cables are used, which reduce the emission of interference signals thanks to their shield around the current-carrying cores. In unshielded onboard power supplies, on the contrary, the cables are designed with no shielding. However, the overall vehicle must meet the same demands of electromagnetic compatibility (EMC) for both onboard network variants. Therefore, voltage fluctuations arising in the unshielded onboard network in components hooked up to the onboard network must be dampened or heavily dampened within the component itself. For this reason, more costly integrated filters are often required in components for an unshielded onboard network, so that these components are larger and more cost-intensive than components for shielded onboard power supplies.

Therefore, components which have been developed for a shielded onboard network are often not suited for a connection to an unshielded onboard network and have to be developed once more with substantial expense for their use on an unshielded onboard network.

Various filters which can be used in components for interference suppression are known from the publications US 2020/0 079 233 A1, EP 2 891 576 A2 and DE 10 2020 209 238 A1.

BRIEF SUMMARY

Embodiments of the disclosure make possible better compatibility of components with various vehicle platforms having different onboard power supplies.

According to the present disclosure, in a motor vehicle of the above mentioned kind in which a component is connected across a filter module to the DC voltage onboard power supply, wherein the filter module is connected across at least one onboard power supply connection of the filter module to the DC voltage onboard power supply and across at least one component connection of the filter module to the component, wherein the filter module is designed to dampen alternating voltage coupled into the at least one component connection by the component, wherein the motor vehicle additionally comprises a shielding means, which encloses either at least one power supply line, connecting the respective component to the respective component connection of the filter module, or at least one connection region, in which the component connection or at least one of the component connections contacts a respective power supply connection of the component, together with the component and the filter module, and which is adapted to at least partly shield out the electromagnetic radiation emitted from the power supply line or the connection by virtue of the coupled-in alternating voltage, the respective component connection being reversibly detachable from the component or the respective power supply line.

The filter module in particular makes it possible to use components designed for onboard power supplies with a certain shielding and which can be used in them without the filter module also in onboard power supplies with worse or no shielding. This affords the benefit that the components can be developed with less expense and produced in larger lot numbers, since they are compatible with various onboard power supplies thanks to the filter module.

The DC voltage onboard power supply of the motor vehicle can be a so-called unshielded DC voltage onboard power supply. Thus, the DC voltage onboard power supply can be designed with no shielding means and it may have at least partly unshielded cables. Alternating voltage components in the onboard network might thus disrupt other components or external devices by electromagnetic influences. Therefore, components hooked up to the DC voltage onboard power supply and potentially producing voltage fluctuations in the onboard network must typically have internal filters, so that the EMC requirements generally applying to all onboard network types can be satisfied Preferably, the component is provided with shielding means and designed for a sufficiently shielded onboard network and thus it has in itself no filter or a quite simple filter. In particular, the onboard network can be an unshielded onboard network. Thanks to the use of the filter module, a coupling in of alternating voltage components in the unshielded onboard network can be avoided or at least significantly reduced and the shielding means suppresses the emission of interference signals from the connection region or by the power supply line, in which the interference signals being filtered are still present, so that EMC requirements can still be obeyed without having to modify the component.

The filter module can be a low-pass filter or comprise a low-pass filter. In addition or alternatively, the filter module can comprise inductances and/or capacitors.

For example, the filter module can be hooked up by two component connections, provided for this, directly to two power supply connections of the component or by a respective power supply line to the component. The power supply connections of the component are terminals which are provided on the component. Alternatively or in addition, power supply connections of the DC voltage onboard power supply can be provided on the onboard network in order to contact the filter module or its onboard network connections, especially directly or through further power supply lines.

The filter module can be connected by a terminal and optionally by a ground cable to a ground potential, for which in motor vehicles a connection to the chassis can be used.

For example, the filter module can have a total of five terminals, namely, one respective onboard power supply terminal for connection to the positive and negative potential of the onboard power supply, one respective component terminal for connection to the positive and negative potential of the component, and one terminal for the grounding connection. Of course, the number of terminals on the filter module is not limited to these five terminals. The filter module can be designed with more than five or also with fewer than five terminals. For example, the filter module can be designed with only four terminals, if for example no connection to ground is provided, so as not to burden the ground with an additional leakage current.

In the filter module, differential mode interference and/or common mode interference can be dampened. For example, in the filter module onboard network connections for connecting to the positive and negative potential of the onboard power supply can be connected in series across a capacitance, which can be called the X-capacitor, in order to dampen a differential mode interference.

A common mode interference can be suppressed, for example, if the onboard power supply connection or at least one of the onboard network connections, especially all onboard network connections, is connected across at least one capacitor, which can be called the Y-capacitor, to the ground potential. In addition or alternatively, a common mode interference can be suppressed if the component connection or at least one of the component connections, especially all of the component connections, is connected conductively by an inductance each time to an onboard power supply connection.

The shielding means prevents or diminishes the emission of electromagnetic waves from the connection region or by the power supply line. It may be advantageous for the shielding to design at least one power supply line, which can connect the component to the at least one component connection, as short as possible. Furthermore, it may be advantageous to design the at least one power supply line with a closely meshed metal braid in the cable shield. The metal braid can form the shielding means or a portion of the shielding means or the enclosure. Suitable metals for this are, in particular, soft magnetic metals, that is, they are ferromagnetic with a high magnetic permeability and a low remanence, such as a soft magnetic nickel-iron alloy.

In addition or alternatively, for example, a metal fabric tape can be used for supplemental shielding of the at least one power supply line, where the metal fabric tape can enclose the at least one power supply line except for the contacting sites. Advantageously, the metal fabric tape is soft magnetic and electrically conductive.

The mentioned shielding methods can also be confined to only a portion of the respective power supply line or the respective connection region, but it may be advantageous to provide an enclosure, especially a rigid enclosure of the respective power supply line or the respective connection region or multiple power supply lines or multiple connection regions, commonly made from a soft magnetic material.

The possibility exists for the shielding means to encompass multiple shielding components. For example, a separate shield or cable shield can enclose multiple power supply lines and/or rigid enclosures may be provided for multiple power supply lines between the component and the respective component connections.

It should be noted for the shielding means being used that gaps or openings can diminish the shield dampening if the largest dimension of the gaps or openings reaches or exceeds the order of magnitude of half the wavelength being screened out. Thus, in any case, a narrow gap, for example one less than 10 mm or less than 5 mm or less than 2 mm, should remain between different parts of the shielding means or between the shielding means and a particular segment, especially a housing segment, of the component or the filter mode involved in the enclosure, for example by arranging the mentioned elements with overlapping.

The respective component connection is reversibly detachable from the component or the respective power supply line, where reversibly means also without causing destruction thereof. Hence, the connection of the respective component connection to the power supply connection or the respective power supply line of the component can be disconnected and connected once again without this causing any damage. This has the advantage that the component can be replaced by another component without this affecting the EMC properties of the DC voltage onboard power supply. A reversible detachable connection can be realized for example by a clamp connection or a plug-in connection.

Preferably, the DC voltage onboard power supply can be a high-voltage onboard network, wherein the high-voltage onboard network comprises at least one unshielded cable which contacts in particular the respective onboard power supply connection. The unshielded cable can be in particular a cable for the positive or negative potential of the direct current network. By a high-voltage onboard network is understood in general an onboard network having a DC voltage of over 60 V and up to 1500 V, where for example an onboard network having a DC voltage of 400 V is usual for electrified motor vehicles.

Preferably, the component can be an inverter or comprise an inverter, wherein the inverter serves in particular for energizing a drive motor of the motor vehicle. The drive motor can be in particular a three-phase motor. A direct current from a battery or the DC voltage onboard power supply can be converted by the inverter into alternating current for the three-phase motor being operated. In addition or alternatively, the inverter can serve also for the energizing of at least one other component, such as an air conditioning compressor. Inverters are components which constitute an interference source, burdening the DC voltage onboard power supply with coupled-in alternating voltage and thereby possibly causing unwanted voltage fluctuations within the DC voltage onboard power supply. This might result in the emission of electromagnetic radiation. The amplitude of the coupled-in alternating voltage and thus that of the interference radiation is significantly reduced, however, by the filter module used according to the disclosure.

The component or at least one of the components can be a chassis component and/or a DC/DC converter and/or a charger integrated in the motor vehicle for an energy storage of the motor vehicle and/or a heating means. These components can also be hooked up to an onboard network, especially a high-voltage onboard network, of the motor vehicle and potentially introduce interference there, which may result in the emission of electromagnetic interference radiation. By using the filter module, such an interference can be at least for the most part suppressed.

Preferably, the respective onboard power supply connection can be reversibly detachable from the DC voltage onboard power supply or a further power supply line which connects the onboard power supply connection to the DC voltage onboard power supply. This has the advantage that the filter module can be developed independently of the DC voltage onboard power supply. Also, the filter module can be arranged on the DC voltage onboard power supply only when needed, namely, when the EMC properties of the component being connected require the connecting of a filter module.

It may be advantageous for the component connection to be connected by at least one clamp connection and/or at least one plug-in connection to the respective power supply connection or the respective power supply line. In addition or alternatively, the onboard power supply connection can be connected by at least one clamp connection and/or at least one plug-in connection to the DC voltage onboard power supply or the respective further power supply line. Clamp connections are detachable force-locking connections between two components. The clamping force is provided, for example, through screws or springs. In a plug-in connection, the connection parts are suitably aligned by form fitting of the plug parts and detachably secured by force locking, in particular. The plug parts can be provided at the respective power supply lines and the respective component connection or the respective onboard power supply connection. In addition, an unintentional detaching of the plug-in connection can be prevented, for example by latching or screwing together.

The filter module can be secured directly to the component or to a housing of the component, in particular being screwed to it. By means of the fastening, the contact between a respective power supply connection of the component and the respective component connection of the filter module can optionally be directly produced or locked.

In one modification of the disclosure, the filter module can be designed for the exclusively inductive dampening of a common mode component of the alternating voltage coupled into the at least one component connection. In particular, Y-capacitors are not needed here, connecting the respective onboard power supply connection to the ground. This can be especially advantageous in making sure that a leakage current going to the ground does not exceed a given budget. Optionally, in addition to the purely inductive dampening of the common mode interference, there can be a dampening or filtering of a differential mode interference, for example, also in capacitive manner.

The filter module can alternatively be designed exclusively as a differential mode filter. This has the advantage that the filter module is more easily configured. Also in this configuration the benefit may be that the ground is not burdened by an additional leakage current of the filter module.

In a further alternative, in the filter module the onboard power supply connection or at least one of the onboard network connections, especially all of the onboard network connections, can be connected each time by at least one capacitor to the ground potential. Such a capacitor is also called a Y-capacitor. In this way, common mode interference can be suppressed especially efficiently, if the use of a further capacitance between the respective onboard network potential and the ground potential is permissible. The connection to the ground potential can occur here through the shielding means, especially through a shield of a shielded power supply line, or through a separate conductive connection to a grounding surface in the vehicle or another component, especially through a further connection of the filter module.

Besides the motor vehicle according to the disclosure, the disclosure relates to an arrangement with two motor vehicles, wherein a first one of the motor vehicles is a motor vehicle according to the disclosure, wherein a further component is connected to a DC voltage onboard power supply of the second motor vehicle, being identical in design to the component of the first motor vehicle, and by which the DC voltage onboard power supply of the second motor vehicle can be energized in at least one operating mode of the second motor vehicle and/or which is energized by the DC voltage onboard power supply of the second motor vehicle in at least one further operating mode of the second motor vehicle, the further component in the second motor vehicle being connected to the DC voltage onboard power supply of the second motor vehicle without a filter module being connected in between. The arrangement has the benefit that identically designed components can be connected to both DC voltage onboard power supplies, which may differ in terms of their EMC properties, without the component itself having to be newly developed or modified.

In addition, the disclosure relates to a method for connecting a component to a DC voltage onboard power supply of a motor vehicle, involving the steps:

providing a motor vehicle with a DC voltage onboard power supply, a component designed separate from the DC voltage onboard power supply, as well as a filter module designed separate from the component and the DC voltage onboard power supply, connecting the filter module to the DC voltage onboard power supply by at least one onboard power supply connection of the filter module, and connecting the filter module to the component by at least one component connection of the filter module, such that the connection is reversibly detachable.

In this method, in particular, the last two mentioned steps of the method can be performed in any desired sequence.

In particular, a motor vehicle according to the disclosure can be produced by the method. Independently of this, the method according to the disclosure with the features explained for the motor vehicle according to the disclosure can be modified with the benefits mentioned there, and vice versa.

BRIEF DESCRIPTION OF THE SEVERAL VIEWS OF THE DRAWINGS

Further benefits and features of the disclosure will emerge from the following exemplary embodiments as well as the accompanying drawings. These show in diagrams.

DETAILED DESCRIPTION

Figure 1:
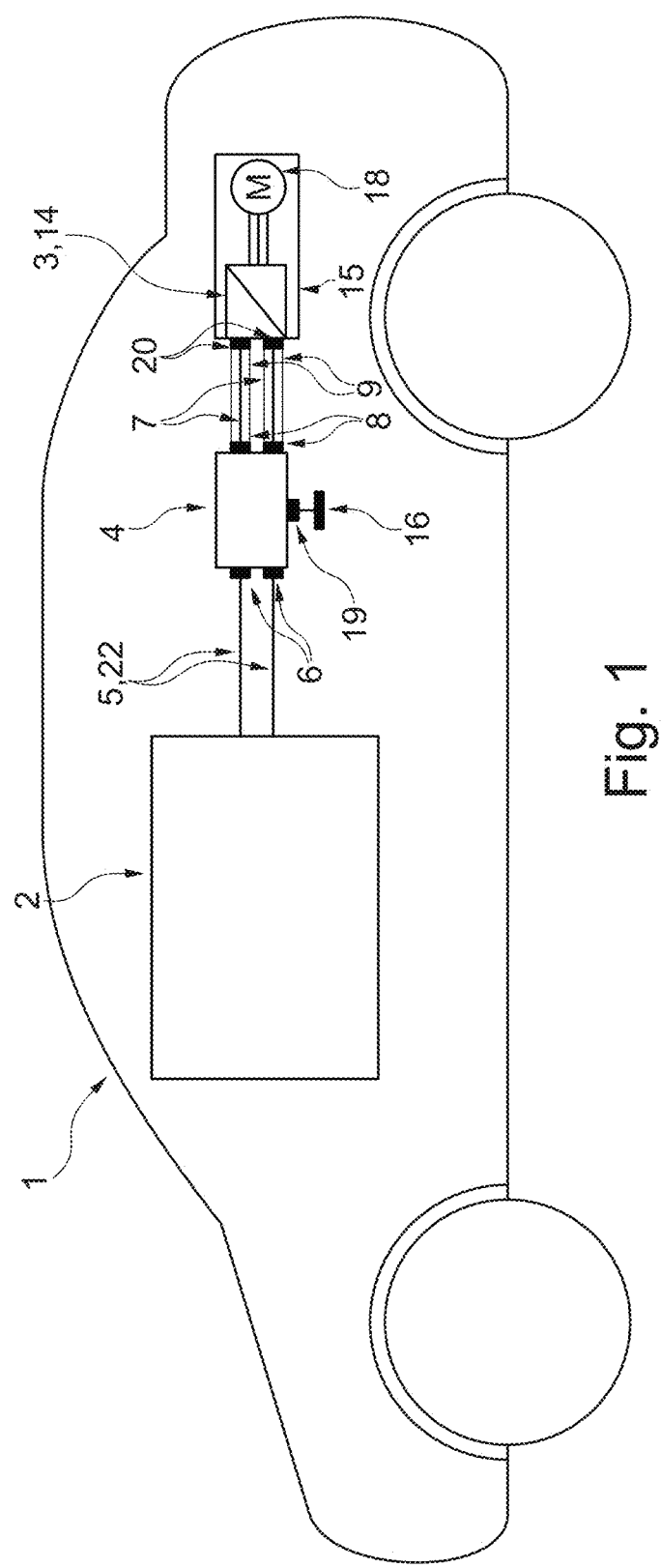
FIG. 1 shows an exemplary embodiment of a motor vehicle according to the disclosure, which can be produced by an exemplary embodiment of the method according to the disclosure.

FIG. 1 shows a motor vehicle 1 having a component 3 hooked up to a DC voltage onboard power supply 2, by which the DC voltage onboard power supply 2 can be energized in at least one operating mode of the motor vehicle 1 and/or which is energized in at least one further operating mode of the motor vehicle 1 by the DC voltage onboard power supply 2. The component when hooked up directly to the DC voltage onboard power supply 2 might modulate interference or alternating voltage components onto the direct current in the DC voltage onboard power supply. It is therefore usual to provide a shielding of the entire DC voltage onboard power supply 2, in order to suppress the emission of electromagnetic interference radiation due to the alternating voltage component.

On the other hand, if an unshielded DC voltage onboard power supply is to be used, as is the case in FIG. 1, an internal filter is usually employed in the component 3. However, this has the drawback that components developed for shielded onboard power supplies cannot be used forthright in unshielded onboard power supplies. Therefore, a different approach to the noise suppression will be used in the motor vehicle shown in FIG. 1, as will be explained in the following.

FIG. 1 shows a motor vehicle 1 having a DC voltage onboard power supply 2, the DC voltage onboard power supply 2 in this example being unshielded. In order to hook up to this DC voltage onboard power supply 2 a component 3, having a shielded housing 15 in the example, a filter module 4 will be used in the example.

The filter module 4 in this example is connected by two onboard network connections 6 to the DC voltage onboard power supply 2 and by two component connections 8 of the filter module 4 to the component 3. The filter module 4 is designed to dampen alternating voltage coupled into the component connections 8 by the component 3. In this way, the amplitude of the alternating voltage coupled into the DC voltage onboard power supply 2 and thus that of the emitted interference radiation is significantly dampened and preferably reduced to basically zero, so that no shielding of the DC voltage onboard power supply is required.

In addition, the motor vehicle 1 comprises a shielding means 9, which suppresses the emission of electromagnetic radiation prior to the dampening of the alternating voltage component by the filter module 4 or on the side of the filter module with the component. In the example, two power supply lines 7, each connecting one of the power supply connections 20 of the component 3 to the respective component connection 8 of the filter module 4, are commonly enclosed by a respective shielding element of the shielding means 9, such as a metal braid, the housing 15 of the component 3 and the filter module 4.

In an alternative configuration, the component connections 8 could also be hooked up directly to the power supply connections 20. In this case, the connection region where this connection occurs can be enclosed by the use of the shielding means.

The two component connections 8 are reversibly detachable from the component 3 or the respective power supply line 7. For example, clamping or plug-in connections can be provided for this, to bring the power supply lines 7 to the component connections 8.

The filter module 4 in this example is a low-pass filter, comprising capacitors and optionally inductances in the example and able to dampen both common mode interference and differential mode interference. For this, the filter module 4 is hooked up across two component connections 8 provided for this and across two power supply lines 7 to two power supply connections 20 of the component 3. In addition, the filter module 4 is hooked up across two onboard network connections 6 provided for this to two further power supply lines 5, which in this example are designed as unshielded cables 22, at the DC voltage onboard power supply 2. In this example, the filter module 3 is additionally connected by a terminal 19 to ground 16 or to a mass potential, this typically occurring by a connection to the chassis of the motor vehicle 1.

The two onboard network connections 6 with positive and negative potential are connected in series in the example across a capacitance (X-capacitor), not shown, in order to dampen a differential mode interference. A common mode interference can be suppressed, for example, by having both onboard network connections 8 connected to ground 16 across at least one capacitor (Y-capacitor), not shown. In addition or alternatively, a common mode interference can be suppressed if one respective component connection 8 is connected to one respective onboard power supply connection 6 across an inductance.

In an alternative configuration, the filter module can be adapted for the exclusive inductive dampening of a common mode component of the alternating voltage coupled into the at least one component connection 8. In this case, in particular, no Y-capacitors are required. This can be advantageous in order to ensure that a leakage current drained to ground 16 does not exceed a given budget. Optionally, in addition, a dampening or filtering of a differential mode interference can also occur capacitively, for example.

In another alternative, the filter module 4 can be designed exclusively as a differential mode filter. This has the advantage that the filter module 4 has a simpler design. Also in this alternative, it may be advantageous that the ground 16 is not burdened by an additional leakage current of the filter module 4.

In the example, the shielding means 9 comprises multiple shielding elements, each of them surrounding one of the power supply lines 7. As the shielding element, a metal fabric tape as cable shield can enclose the respective power supply lines 7. The metal used in the metal fabric tape can be a soft magnetic nickel-iron alloy, for example. The shielding means 9 dampens the electromagnetic radiation emitted by the power supply lines 7, which arises on account of the alternating voltage coupled into the power supply lines 7 due to the component 3. Alternatively, a metal fabric tape and/or an enclosure, for example a rigid one, can be used to enclose the respective power supply line or the respective connection region or multiple power supply lines or multiple connection regions.

The DC voltage onboard power supply 2 in this example is a high-voltage onboard network, the high-voltage onboard network comprising unshielded cables 22 in this example, which make contact in particular with the respective onboard power supply connection 6. The unshielded cables 22 can be in particular cables with respective positive and negative potential of the direct current network.

The component 3 in the exemplary embodiment is an inverter 14. The inverter 14 is connected to a drive motor 18 by the cables provided for this. The drive motor 18 is designed, for example, as a three-phase motor. Alternatively, in modifications of the motor vehicle 1 not shown, the inverter 14 could serve, alternatively or additionally, to energize other components, such as an air conditioning compressor. It would also be possible, as was already explained in the general portion of the specification, to energize by the filter module, instead of the inverter 14, for example a chassis component and/or a DC/DC converter and/or a charger integrated in the motor vehicle for an energy storage of the motor vehicle and/or a heating means.

The two unshielded cables 22 in the example can likewise be reversibly disconnected from the onboard network connections 6 and hooked up to them once again. Thus, in this example, the filter module 4 can also be replaced or completely removed as needed.

The motor vehicle 1 according to the exemplary embodiments of FIG. 1 can be produced by a method in which first of all the DC voltage onboard power supply 2 of the motor vehicle 1, the component 3, and the filter module 4 are provided as separate components.

In this example, the DC voltage onboard power supply 2 is designed without shielding means. The component 3 can be, for example, an inverter 14, having a shielded housing 15. The filter module 4 can be a low-pass filter, for example, comprising inductances and capacitances, with which both common mode interference and differential mode interference can be dampened. The filter module 4 in this exemplary embodiment is provided with five terminals.

In a further step of the method, the onboard network connections 6 of the filter module 4 are connected to the unshielded cables 22 of the DC voltage onboard power supply. The component connections 8 are then connected to the power supply lines 7 of the inverter 14. The power supply lines 7 are surrounded by a shielding means 9, such as a metal fabric tape made from a soft magnetic nickel-iron alloy. As explained above for the motor vehicle, a direct connection of the component and the filter module would also be possible alternatively.

The fastening of the unshielded cables 22 to the onboard network connections 6 or the fastening of the respective power supply lines 7 to the component connections 8 is done with clamp or plug-in connections. In this exemplary embodiment, the connections are made to both the inverter 14 and the DC voltage onboard power supply 2 such that the connections are reversibly detachable.

In the method example, the filter module 4 is hooked up by a terminal 19 to ground 16, usually being the chassis of the motor vehicle, and the inverter 14 is hooked up to a drive motor 18, such as a three-phase motor.

Figure 2A:
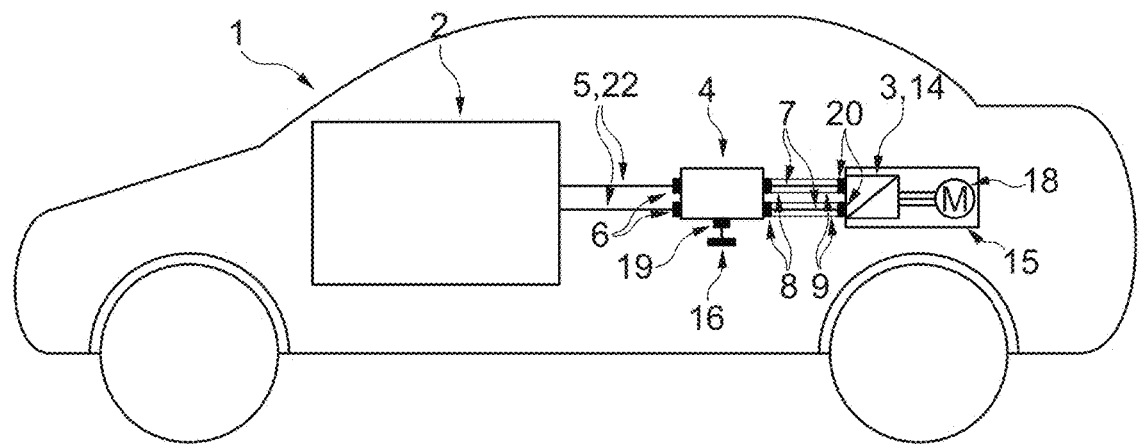
FIGS. 2A and 2B show an exemplary embodiment of an arrangement according to the disclosure with two motor vehicles.
Figure 2B:
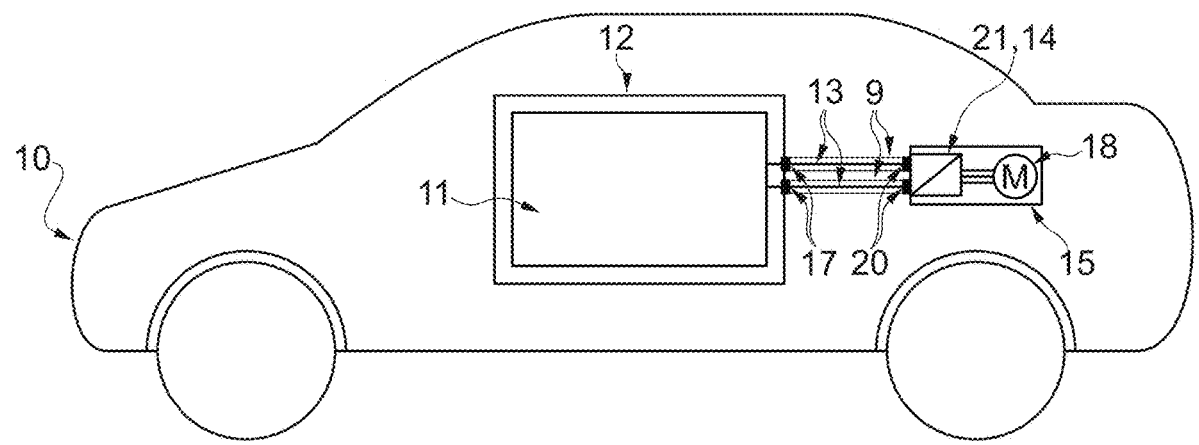

The disclosure has the advantage that components of the same design can be used in motor vehicles having different onboard network types. This is shown on the example of an arrangement with two motor vehicles 1, 10 in FIGS. 2A and 2B.

A first motor vehicle 1 here corresponds in its overall layout to the motor vehicle 1 of FIG. 1. A second motor vehicle 10 differs from the motor vehicle 1 by its DC voltage onboard power supply 11. The DC voltage onboard power supply 11 is configured with a shield 12 provided for this, so that a larger alternating voltage portion is permissible in the DC voltage onboard power supply 11 of the second motor vehicle 10, for the same EMC requirements, than in the DC voltage onboard power supply 2 of the first motor vehicle 1.

In the second motor vehicle 10, for example, a component 21 identical in design to the component 3 of the first motor vehicle 1 is hooked up across two power supply connections 17 of the DC voltage onboard power supply 11 and two power supply lines 13, for example. In this example, the component 21 is an inverter 14, which is located in a shielded housing 15. The power supply lines 13 are surrounded with a shielding means 9, for example a metal fabric tape made from a soft magnetic nickel-iron alloy.

Since the DC voltage onboard power supply 11 of the motor vehicle 10 is designed with a shield, the interference signals emanating from the inverter 14 at its terminals do not result in an emission of electromagnetic interference radiation by the onboard network into the region beyond its shield 12, or at least not in a problematical extent. Therefore, the installing of a filter module 4 in order to hook up the inverter 14 in the motor vehicle 10 is not necessary, which saves on weight and design space. If the component had an internal filter, the component would have to be modified for different onboard network types or even be newly developed, if such a savings were to be achieved in the shielded onboard network.

German patent application no. 102022132613.6, filed Dec. 8, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle comprising:
a direct current (DC) voltage onboard power supply;
at least one component connected to the DC voltage onboard power supply,
wherein the at least one component, in operation, energizes the DC voltage onboard power supply in at least one operating mode of the motor vehicle, or the DC voltage onboard power supply, in operation, energizes the at least one component in at least one further operating mode of the motor vehicle;
a filter module,
wherein the at least one component is connected across the filter module to the DC voltage onboard power supply,
wherein the filter module is connected across at least one onboard power supply connection of the filter module to the DC voltage onboard power supply and across at least one component connection of the filter module to the at least one component,
wherein the filter module, in operation, dampens an alternating voltage coupled into the at least one component connection by the at least one component; and
a shield that encloses either at least one power supply line that connects the at least one component to the at least one component connection of the filter module, or at least one connection region in which the at least one component connection contacts the at least one onboard power supply connection of the at least one component together with the at least one component and the filter module,
wherein the shield, in operation, at least partly shields out electromagnetic radiation emitted from the at least one power supply line or the at least one component connection by virtue of the alternating voltage coupled into the at least one component connection, and
wherein the at least one component connection is reversibly detachable from the at least one component or the at least one power supply line of the DC power supply.

2. The motor vehicle according to claim 1, wherein the DC voltage onboard power supply is a voltage onboard network including at least one unshielded cable that contacts the at least one one onboard power supply connection.

3. The motor vehicle according to claim 1, wherein the at least one component is an inverter or includes an inverter, wherein the inverter, in operation, energizes a drive motor of the motor vehicle.

4. The motor vehicle according to claim 1, wherein the at least one component is a chassis component, a DC/DC converter, a charger integrated in the motor vehicle for an energy storage of the motor vehicle, or a heater.

5. The motor vehicle according to claim 1, wherein the at least one onboard power supply connection is reversibly detachable from the DC voltage onboard power supply or a further power supply line that connects the at least one onboard power supply connection to the DC voltage onboard power supply.

6. The motor vehicle according to claim 1, wherein the filter module is secured directly to the at least one component or to a housing of the at least one component.

7. The motor vehicle according to claim 1, wherein the at least one component connection is connected by at least one clamp connection or at least one plug-in connection to the at least one onboard power supply connection or the at least one power supply line, or the at least one onboard power supply connection is connected by the at least one clamp connection or at least one plug-in connection to the DC voltage onboard power supply or a further power supply line that connects the at least one onboard power supply connection to the DC voltage onboard power supply.

8. The motor vehicle according to claim 1, wherein the filter module, in operation, inductively dampens a common mode component of the alternating voltage coupled into the at least one component connection.

9. The motor vehicle according to claim 1, wherein the filter module includes a differential mode filter.

10. The motor vehicle according to claim 1, wherein, in the filter module, the at least one onboard power supply connection is connected by at least one capacitor to a ground potential.

11. An arrangement with two motor vehicles,
wherein a first one of the motor vehicles is a motor vehicle according to claim 1,
wherein at least one further component is connected to a DC voltage onboard power supply of a second one of the motor vehicles
wherein the at least one further component has a same design as the at least one component of the first one of the motor vehicles, and
wherein the at least one further component, in operation, energizes a DC voltage onboard power supply of the second one of the motor vehicles in at least one operating mode of the second one of the motor vehicles, or the DC voltage onboard power supply of the second motor vehicle, in operation, energizes the at least one further component in at least one further operating mode of the second motor vehicle,
wherein the at least one further component in the second motor vehicle is connected to the DC voltage onboard power supply of the second motor vehicle without a filter module being connected in between.

12. A method for connecting a component to a DC voltage onboard power supply of a motor vehicle, comprising:
providing a motor vehicle with a DC voltage onboard power supply, a component designed separate from the DC voltage onboard power supply, and a filter module designed separate from the component and the DC voltage onboard power supply,
connecting the filter module to the DC voltage onboard power supply by at least one onboard power supply connection of the filter module, and
connecting the filter module to the component by at least one component connection of the filter module such that the at least one component connection is reversibly detachable.

* * * * *